United States Patent [19]

Schwab et al.

[11] Patent Number: 5,283,738

[45] Date of Patent: Feb. 1, 1994

[54] PROCESS AND DEVICE FOR CONTROLLING A CLUTCH

[75] Inventors: Manfred Schwab, Friedrichshafen; Wolfgang Runge, Ravensburg; Wolf-Dieter Gruhle, Tettnang, all of Fed. Rep. of Germany

[73] Assignee: Zahnradfabrik Friedrichshafen AG, Fed. Rep. of Germany

[21] Appl. No.: 640,402

[22] PCT Filed: Jul. 26, 1989

[86] PCT No.: PCT/EP89/00878

§ 371 Date: Jan. 18, 1991

§ 102(e) Date: Jan. 18, 1991

[87] PCT Pub. No.: WO90/01431

PCT Pub. Date: Feb. 22, 1990

[30] Foreign Application Priority Data

Jul. 30, 1988 [DE] Fed. Rep. of Germany ....... 3826068

[51] Int. Cl.$^5$ .................... G06F 15/50; F16D 11/06
[52] U.S. Cl. .................................... 364/424.1; 74/866; 192/52; 192/3.58
[58] Field of Search .......... 364/424.1, 426.02, 431.02; 74/866, 867; 192/52, 0.052, 3.3, 3.58, 0.076, 3.31, 0.032

[56] References Cited

U.S. PATENT DOCUMENTS

| | | | |
|---|---|---|---|
| 4,428,467 | 1/1984 | Hiramatsu | 192/3.31 |
| 4,577,737 | 3/1986 | Nikura et al. | 192/0.032 |
| 4,653,351 | 3/1987 | Downs et al. | 74/866 |
| 4,662,488 | 5/1987 | Hiramatsu et al. | 192/3.58 |
| 4,724,939 | 2/1988 | Lockhart et al. | 192/3.3 |
| 4,783,957 | 11/1988 | Harris | 364/431.02 |
| 4,947,970 | 8/1990 | Miller et al. | 192/0.076 |
| 5,010,990 | 4/1991 | Yoshimura et al. | 192/3.3 |
| 5,029,087 | 7/1991 | Cowan et al. | 364/424.1 |
| 5,069,319 | 12/1991 | Makabe | 192/0.052 |
| 5,176,234 | 1/1993 | Reik et al. | 192/0.052 |

FOREIGN PATENT DOCUMENTS

3627958 2/1987 Fed. Rep. of Germany.

OTHER PUBLICATIONS

Patent Abstracts of Japan, vol. 7, No. 1, M183, abstract from JP 57-160723, pub. Oct. 4, 1982 Aishin Seiki K.K.

*Primary Examiner*—Thomas G. Black
*Assistant Examiner*—Jacques H. Louis-Jacques
*Attorney, Agent, or Firm*—Davis, Bujold & Streck

[57] ABSTRACT

A process for controlling a clutch incorporated between the driving engine (M) and the gearbox (G) of a motor vehicle, in which the clutch is a bridging clutch (WK) of a hydrodynamic unit or a separating clutch (K) in a driving train. The process uses devices to measure the engine speed (n-M) and the gearbox output speed (n-ab) and a slip regulating switch mechanism (1). The slip regulating switch mechanism (1) determines the pressure for an actuator (3) of the clutch. The control deviations are derived from a comparison (4) of predetermined slip reference values (w) and the actual slip values (s) obtained from the equipment speeds, and converted to pressures in accordance with a predetermined control algorithm in the regulator (6). The clutch output speed (n-K, n-WK) required for a determination of the slip is obtained from the gear ratio (G-x) and the gear output speed (n-ab). During the shift process (t-0 to t-3), a virtual clutch output speed (n-Kvir) is determined and used to further implement slip control, or the pressure for the actuator (3) of the clutch (K, WK) is varied as a function of predetermined parameters.

8 Claims, 2 Drawing Sheets

PROCESS AND DEVICE FOR CONTROLLING A CLUTCH

The invention concerns a process and an apparatus for control of a clutch.

BACKGROUND OF THE INVENTION

DE-OS 34 38 594 disclosed a control mechanism for a clutch in which the speeds of the engine and the input and output speeds of the transmission are detected and processed in an electronic clutch control for slip modulation of the clutch.

The slip control switch itself, which modulates the actuator for the clutch, takes place depending only on the input speed of the engine and the transmission. The output speed of the transmission, which is proportional to the velocity of the vehicle, is used only for determining the vehicle downtime or a sequence velocity.

However, in many transmission controls, especially in automatic transmissions for passenger cars, the transmission input speed is not directly known, since no adequate sensors are placed on the output shaft of the clutch or on the turbine shaft in the case of automatic transmissions with a hydrodynamic torque converter. But the output speed of the turbine or the clutch can obviously be calculated from the ever-present velocity of the vehicle which corresponds to the output speed of the transmission and from the equally known gear ratio in the transmission. But during a gear change, which lasts a certain period of time, the gear ratio is not defined so that the output speed of the clutch cannot be so simply calculated.

SUMMARY OF THE INVENTION

Therefore, the problem to be solved by the invention is to develop further a control mechanism for a clutch in a manner such that, even without knowing the clutch output speed, a gear change of good quality results without detracting from the comfort or without spinning the engine.

With the specification of certain parameters for the pressure modulation of the clutch, it is possible, for example, to lower the clutch pressure at the beginning of the gear change and keep it constant for the duration of the change. Thereby the slip is increased and the change made more comfortable. But it is also possible, for a further improvement, to load-dependently modulate the lowering of the load for the entire duration of the gear change. While these simple solutions work without a return signal of measured magnitudes, higher demands can be satisfied by determining the virtual clutch output speed, then using the speed, in combination with the ever-present engine speed, for slip control regulation during the gear change operation. With both fundamental possibilities, the slip of the clutch and therewith the quality of the gear change can be modulated.

During the idle time, which is always present during the introduction of a change of gear and remains present until the shifting elements act—loading time—, the slip should be kept constant. The improvement in the gear shift is thus accomplished by simple means. By a time-dependent or also load-dependent control of the pressure, it is possible at relatively low expense to improve further the adaptation to the consecutive adjusting operation in the new gear, and also possible to vary the load changes in accordance with the torque, the change of torque, or also the position of the throttle valve, for example.

The slip regulation, which is introduced during one gear, is effected with the values of the ever-present engine speed and of the clutch output speed calculated from the transmission output speed and the gear ratio, and it can be continued in the same fashion by determining the virtual clutch output speed for the period of time in which no gear is introduced. At the same time, the determination can be advantageously effected from the transmission output speed and virtual gear ratio which, in another embodiment, is calculated from the old and the new ratio according to a transition period function. For a further improvement in the change of a gear, it is possible to set the slip nominal value, which enters in the slip regulation when a gear is introduced, still higher. This can take place periodically for a further improvement depending also on the load. Another improvement is possible if the transition period function is load-dependently changed.

The invention is not confined to the combination of features of the claims. Other logical possible combinations result to one skilled in the art from the claims and separate features of the claims according to the problem in question.

BRIEF DESCRIPTION OF THE DRAWINGS

Other details of the invention are explained with reference to the drawings and embodiments.

In the drawings.

BRIEF DESCRIPTION OF THE PREFERRED EMBODIMENT

Figure 1:
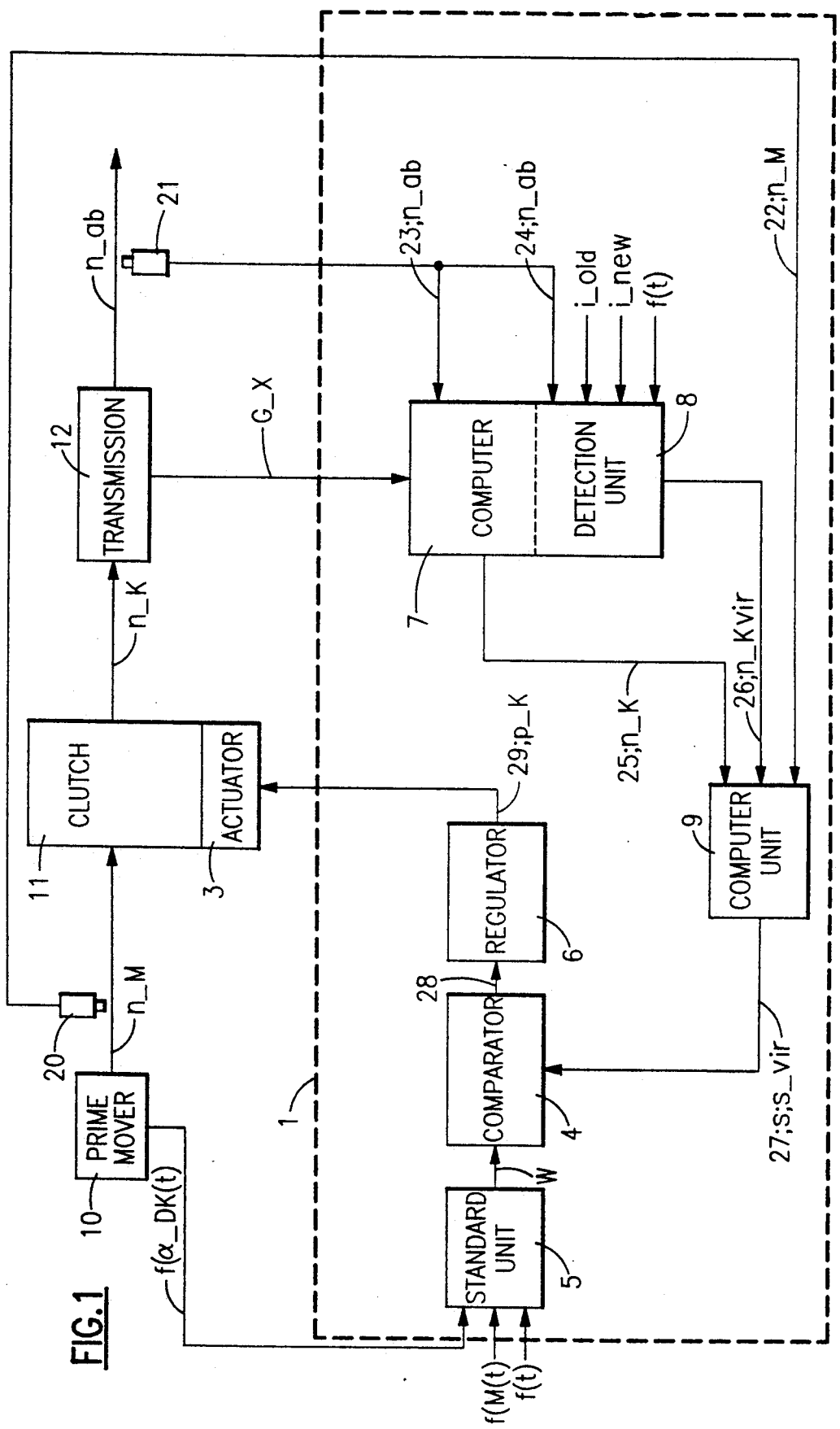
FIG. 1 is a block diagram of the power train with the slip control circuit of the clutch or lock-up clutch.

In FIG. 1, 10 designates the prime mover, 11 the clutch, which can be constructed as a dividing clutch in a drive train or as a lock-up - bridging clutch and will hereinafter be known only as clutch, and 12 designates the transmission. Sensors 20, 21 are placed for detecting the engine speed $n\_M$ and the transmission output speed $n\_{ab}$. An actuator 3 is connected with the clutch 11 and, in a manner known per se in the case of a dividing clutch, designed as an actuation unit which actuates said clutch via a clutch-engaging and clutch-disengaging lever and via a release lever or release bearing. In the case of a bridging clutch WK for a hydrodynamic unit such as a hydrodynamic torque converter, the actuator is mainly designed as a pressure piston unit so that the pressure $p\_K$ for the clutch actuation acts directly, via the piston, upon the clutch disc, for example. With the bridging clutch, the turbine and the pump shaft of the hydrodynamic unit are spanned, in a manner known per se, mainly with a one-disc clutch.

A computer unit 7, which computes the clutch output speed $n\_K$ or $n\_{WK}$ from the transmission output speed $n\_{ab}$ fed via the line 23 and from the gear ratio $G\_x$, is situated in a slip control shift mechanism 1. The gear ratio $G\_x$ is mainly information concerning the gear precisely introduced so that the coordinated ratios i_gear stored in the computer unit can be multiplied by the transmission output speed.

$$n\_K = i\_gear \times n\_ab$$

During a gear change, that is, during the time in which a gear is not engaged, the corresponding information about the gear ratio G_x is unavailable. For this time period only (t_0 to t_3 from FIG. 3), which occurs during every gear change, a detection unit 8 is arranged in which is determined a virtual output speed n_Kvir comparable to the clutch output speed n_K. A virtual ratio i_vir with an intermediate magnitude f(t) being more than 0 and less than 1, is determined from the transmission output speed n_ab (line 24), the ratios from the old gear i_old, the new gear i new, and a transition period function f(t).

$$i\_vir(t) = i\_old \times f(t) + i\_new \times (1 - f(t))\ 0 - f(t) - 1$$

The virtual clutch output speed is then n_Kvir = i_vir × n_ab

Figure 4:
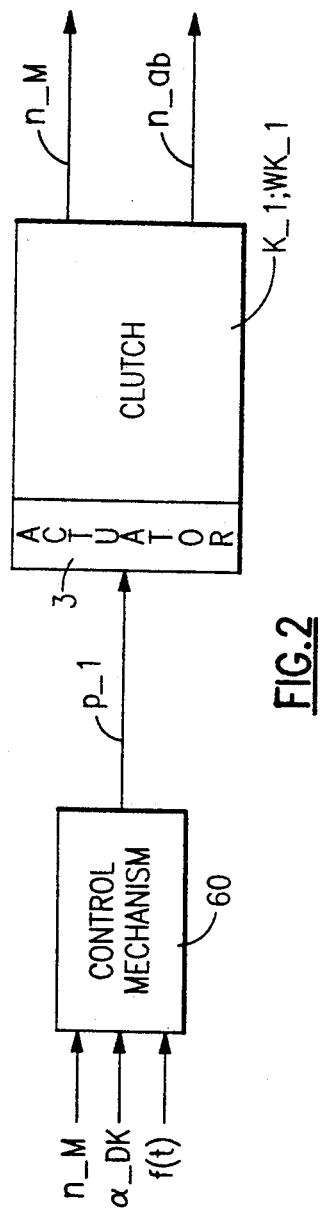
FIG. 4 is the ratio in the transmission before and after an up-change plotted over time.

As can be seen in FIG. 4, the virtual ratio i_vir acts only during the second time interval T_2, since only during the idle time, that is, during the first time interval T_1, are the pressure spaces loaded for the clutch actuation—gear change clutch. At the end of T_2, a time interval T_3 is provided in which the adaptation to the new gear is introduced, the course of i_vir entering softly, that is, without jumps or skids, into the new ratio i_new. In the computer unit 9, the actual slip value s is determined from the engine speed n_M (line 22) and, while a gear is introduced, from the calculated clutch output speed n_K (line 25) or during the change from n_Kvir (line 26).

$$s = \frac{n\_m - n\_K}{n\_M} \qquad s\_vir = \frac{n\_M - n\_Kvir}{n\_M}$$

The actual slip s; s_vir so calculated is fed via line 27 to the comparator 4 and is there compared with the nominal slip value w. The nominal slip value w can here be input or preset from a memory and/or a standard unit 5. For a further modulation change, the nominal slip value w can be set high depending on time, for example w = w_normal + w_shift(t) for t_0 < t < t 3; the high time-dependent setting is also possible to be load-dependent, for example, w_shift(t) = f (load (t)) depending on engine torque or torque change, or on a comparable engine service control in diesel engines. The load dependence of the shift transition can be additionally effected in combination with the transition period function, that is, i_vir(t), it being possible to vary the periodical course of the transition in a manner either firmly specified or depending on load.

Figure 2:
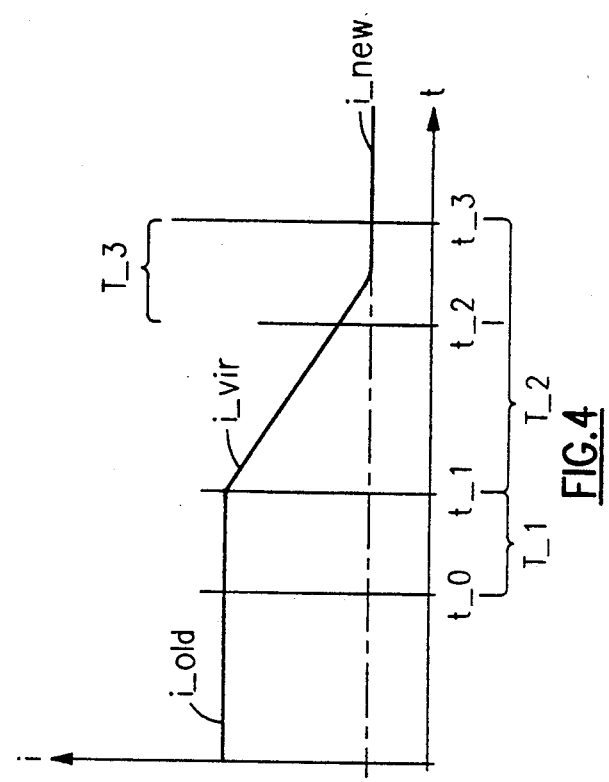
FIG. 2 is a block diagram of the pressure control for the clutch/lock-up bridging clutch.

A difference in the comparison of nominal value w and actual value s of the slip is fed to the regulator 6 via line 28. The regulator 6 controls, according to an established control algorithm, the pressure p_K which can control via the actuator 3 both a dividing clutch in a drive train and a lock-up bridging clutch in a torque converter. For less accurate solutions it is also possible to carry out the pressure regulation for clutch actuation during the gear change with still less expense, by the use of a pressure control. In such a mechanism, according to FIG. 2, the pressure p_1 for reversing, which is determined according to established steps, is passed by a control mechanism 60 to the actuator 3 of the dividing or bridging clutch K_1; WK_1. No return signal results due to measured magnitudes.

Figure 3:
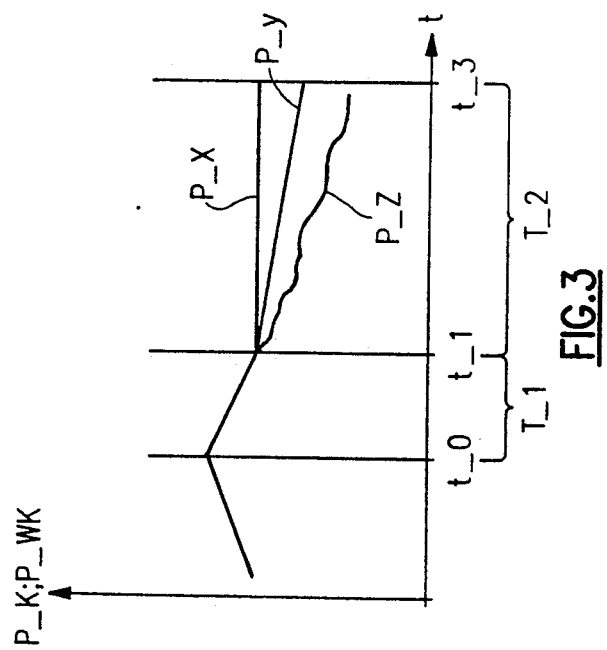
FIG. 3 is a diagram of the pressure for actuation of the clutch or lock-up clutch during a change of gear plotted over time.

During a first time interval T_1 according to FIG. 3, that is, during idle time in which the clutches are loaded for a gear change, there becomes adjusted, due to low pressure p_1, a certain slip such as a higher one which then, during a second time interval T_2 is kept constant p_x until a gear is again introduced in during interval t_3. But during the second time interval T_2, a periodically controlled change of the pressure p_y can take place for a better adaptation to the next adjusting operation which begins with the newly introduced gear. For better adaptation to the load changes during the gear shift, instead of the periodical variation, the pressure can also be balanced depending on the engine torque $$p\_K = f(M(t))$$

or on the change of torque.

$$p\_K = f(M(t\_1) - M(t))$$

The adaptation to the load changes can also take place via a pressure which varies depending on the position of the throttle valve or on a comparable engine service control in diesel engines.

$$p\_K = f(a\_DK(t))$$

To carry out this solution, it is necessary to provide a line from the prime mover M to the control mechanism 60 for transmitting the necessary information.

The purpose of this function is to adapt the clutch pressure p_K, and therewith the transmissible torque, to the torque given by the prime mover M, said adaptation being possible via the throttle valve position a_DK(t), the torque M(t), or the torque change M(t_1)-M(t). In this manner, in case of intermittent load changes during shifting, not too great deviations from the desired result is obtained.

From FIG. 3 where the pressure for the clutch actuation p_K, p_WK is plotted over the time t during a gear change, the change begins at t_0. During the time interval T_1, from t_0 to t_1, an idle time results in which, for example, the loading of the piston space takes place by the actuation of the clutch which effects the change of gear. During this period of time, a certain pressure is adjusted such as a lower pressure which increases the slip. During a second time interval T_2, from t_1 to t_3, said adjusted pressure is either kept constant P_x(p_K = constant), periodically controlled P_y(p_K = f(t)) or, as described already, load-dependently varied P_z(p_K = f(M; Δ_M; a_DK). Here the pressure for the time t prior to t_0 corresponds to the old gear and for the time after t_3 to the new gear.

To determine the virtual clutch output speed n_Kvir in the detection unit 8, a virtual ratio i_vir is first obtained, as described. Here a change of the ratio, according to FIG. 4, results during the shift. During the first time interval T_1, the old ratio still applies like in the old gear, since the gear clutches only act after an idle time. For a second shift interval T_2, between t_1 and t_3, a virtual ratio, as described already, is then obtained.

REFERENCE NUMERALS

M: prime mover
G: gear shift mechanism

G_x: gear ratio
K; K_1: clutch/dividing clutch
WK; WK_1: lock-up bridging clutch
w: slip nominal value
s: slip actual value
s_vir: virtual slip actual value
1: slip control switch mechanism
20: sensor for engine speed
21: sensor for transmission output speed
22 to 28: lines
29: pressure line
3: actuator for clutch (pressure actuator)
4: comparator
5: memory/standard unit
6: regulator
60: adjusting mechanism
7: computer unit
8: detection unit
9: computer unit for slip actual value s
P_x: constant controlled pressure
P_y: periodically controlled pressure
P_z: load-dependently controlled pressure
P_K: regulated pressure for the clutch
n_M: engine speed
n_K: clutch output speed
n_Kvir: detected clutch output speed
n_WK: output speed for the lock-up clutch
n_WKvir: detected output speed of the lock-up clutch
n_ab: transmission output speed
T_1: first time interval
T_2: second time interval
T_3: time interval for adaptation to the new gear
t_0: beginning of the change of gear
t_1: end of idle time
α_DK: throttle valve control/engine power control
t_2: beginning of adaptation to the new gear
t_3: end of the change of gear
i_old: ratio of the old gear
i_new: ratio of the new gear
i_gear: gear ratio
i_vir: virtual gear ratio

We claim:

1. A process for controlling a clutch located in a drive path between an engine (10) and a gear transmission (12) of a motor vehicle, said clutch being one of a bridging clutch (WK), a hydrodynamic unit, and a dividing clutch (11), and having an actuator (3) for controlling actuation of said clutch;

said process incorporating devices for determining an output speed of the engine (n_M) and an output speed of the gear transmission (n_ab) and a slip regulating switch mechanism (1) for determining the pressure of said actuator (3) of said clutch (K or WK);

said process comprising the steps of:

determining a clutch output speed (n_K, n_WK), needed for determining slip, via a gear ratio (G_x) of the gear transmission (12) and a determined gear transmission output speed (n_ab) thereof, determining and comparing (comparator 4) a given nominal slip value (w) of the engine with an actual sip value (s) of the engine;

converting a difference between the given nominal slip value (w) and the actual sip value (s) into a pressure according to a standard algorithm (6); and, controlling said clutch, during a gear change operation (t_0 to t_3) on the basis of a virtual clutch speed (n_Kvir) for which a virtual ratio i_vir (t)=i_old×f(t)+i_new×(1−f(t)) is defined as an intermediate magnitude, wherein i_old is the ratio of the previous gear, i_new is the ratio of the new gear and f(t) is a transition period function which, during the course of the gear change (from t_0 to t_3), decreases from 1 to 0.

2. A process according to claim 1, said process further comprising the step of:
time-dependently increasing the nominal slip value (w) during the gear change (t_0 to t_3).

3. A process according to claim 1, said process further comprising the step of:
load-dependently increasing the nominal slip value (w) during the gear change (t_0 to t_3).

4. A process according to claim 1, said process further comprising the step of:
load-dependently changing said transition period function (f(t)).

5. A process according to claim 1, said process further comprising the step of:
providing a computer unit (7) for determining the clutch output speed (n_K) from the gear ratio (i_gear) and the gear transmission output speed (n_ab); and
providing a detection unit (8) for determining, when the signal for the gear ratio (G_x) is not available, the virtual clutch output speed (n_Kvir) from the gear transmission output speed (n_ab), the ratios of the old (i_old) and of the new (i_new) gears, and a transition period function (f(t)).

6. A process according to claim 1, said process further comprising the step of:
following a determination of the clutch output speed (n_K, n_WK) needed for determining the slip, controlling said actuator (3) of said clutch during a gear change operation (from t_0 to t_3) with a time interval defined as idle time (T_1) by decreasing the pressure of said actuator of said clutch (p_K, p_WK) until a predetermined slip occurs; and
maintaining the pressure (p_K) for said actuator (3) of said clutch (K, WK) constant during a following second time interval (T_w) until introduction of a new gear (t_3).

7. A process according to claim 1, said process further comprising the step of:
following a determination of the clutch output speed (n_K, n_WK) needed for determining the slip, controlling said actuator (3) of said clutch during a gear change operation (from t_0 to t_3), without a firm gear ratio, with a time interval defined as idle time (T_1) by decreasing the pressure of said actuator of said clutch (p_K), p_WK) until a predetermined slip occurs; and
varying the pressure (p_K) for said actuator (3) of said clutch (K, WK) such that the pressure is varied (P_y), with periodical control, during a following second time interval (T_2) until introduction of a near gear (t_3).

8. A process according to claim 1, said process further comprising the step of:
following a determination of the clutch output speed (n_K, n_WK) needed for determining the slip, controlling said actuator (3) of said clutch during a gear change operation (from t_0-t_3) by decreasing the pressure of said actuator (p_K, p_WK)

during an interval of time defined as idle time (T_1) until a predetermined slip occurs; and
varying the pressure of the actuator (3), during a second time interval (T_2), depending on at least one of the torque change (p_K=f (M(t_1)−M(t))), the torque (p_K=f(M(t))), a position of a throttle valve and a position of a control rack of the prime mover (M), until introduction of a near gear (t_3).

* * * * *